United States Patent [19]

Rundle

[11] 4,049,089

[45] Sept. 20, 1977

[54] ELECTROMAGNETIC BRAKE ASSEMBLY

[75] Inventor: Frederick Stanley Rundle, Montour Falls, N.Y.

[73] Assignee: Shepard Niles Crane & Hoist Corporation, Montour Falls, N.Y.

[21] Appl. No.: 702,420

[22] Filed: July 6, 1976

[51] Int. Cl.² .......................................... B60T 13/04
[52] U.S. Cl. ................................................ 188/171
[58] Field of Search ...................... 188/71.8, 71.9, 170, 188/171; 192/111 B

[56] References Cited

U.S. PATENT DOCUMENTS

| | | | |
|---|---|---|---|
| 2,480,291 | 8/1949 | Gerentes | 188/171 UX |
| 2,701,036 | 2/1955 | Osborne | 188/171 |
| 2,964,137 | 12/1960 | Luedtke et al. | 188/171 X |
| 3,289,797 | 12/1966 | Brzezinski et al. | 188/171 |
| 3,608,679 | 9/1971 | Harrison | 188/171 X |

Primary Examiner—Duane A. Reger
Attorney, Agent, or Firm—Reed, Smith, Shaw & McClay

[57] ABSTRACT

An electromagnetic brake assembly is provided for adjusting the axial distance or gap between the brake wheel and pressure plate assembly during rotation of the brake wheel, without increasing the force exerted by the pressure plate assembly on the brake wheel or varying the force exerted by the electromagnetic means on the pressure plate assembly. Preferably, the pressure plate assembly is comprised of a pressure ring for engaging a brake liner on movement of the pressure plate assembly toward the brake wheel, and a brake armature for engaging an electromagnetic means on movement of the pressure plate assembly away from the brake wheel. Such gap control means is in turn comprised of means for selectively moving the pressure ring relative to the brake armature, most desirably by rotating the pressure ring and brake armature relative to each other. Preferably, the brake assembly also has cooling means for channelling air through passageways adjacent the brake liner, preferably by power provided by the drive shaft to be braked and most desirably by stator means adjacent the periphery of the brake wheel forcing said air through said passageways adjacent the brake liner.

17 Claims, 6 Drawing Figures

ELECTROMAGNETIC BRAKE ASSEMBLY

FIELD OF THE INVENTION

The present invention relates to electromagnetic brake assemblies.

BACKGROUND OF THE INVENTION

Electromagnetic brake assemblies are old and well known in the art. A primary use for such brake assemblies is to brake electric motors, such as those used on hoists and cranes. Illustrative of art known to applicant is U.S. Pat. Nos. 2,462,017, 2,506,028, 2,543,830, 2,668,920, 2,727,163, 2,983,339, 3,171,515, 3,224,540, 3,335,304, 3,357,528, 3,554,335, 3,555,317, 3,659,170, 3,665,231, 3,741,353, 3,763,968, 3,784,852, 3,826,342 and 3,944,028.

An electromagnetic brake assembly is generally contained in a housing fastened to the end of a gear box or electric motor. A brake wheel in the housing is fixed to a drive shaft or the gear box or electric motor, with a pressure plate assembly having at least one brake liner spaced axially from it. The pressure plate assembly is non-rotatably mounted in the housing to move axially on actuation and permit the brake liner to engage the brake wheel to slow and stop the rotation of the motor shaft. The pressure plate is typically urged against the brake wheel by a mechanical bias when the brake assembly is not operating.

The axially movement of the pressure plate assembly is controlled by an electromagnet or electromagnets mounted axially of the pressure plate. To operate the motor, the brake is released by electrically activating the electromagnet, which draws the pressure plate assembly axially away from the brake wheel against the force of the mechanical bias to permit the drive shaft to rotate. The pressure plate assembly is held away from the brake wheel during operation of the electric motor by continual operation of the electromagnet or by secondary means that maintains the pressure plate assembly at a released position. When the motor is stopped, the brake stops the rotation of the motor shaft by allowing the pressure plate assembly to move axially under the force of the mechanical bias to bring the brake liner into engagement with the brake wheel.

One of the primary problems with such electromagnetic brake assemblies is lack of adjustability of the axial distance or gap between the brake wheel and the brake liner of the pressure plate assembly. The air distance varies with the tolerance of the brake assembly and the wear of the brake liner. The mechanical bias urging the pressure plate assembly against the brake wheel is generally an adjustable spring, but adjustment of the spring only compensates for variations in the gap by increasing the force exerted on the pressure plate. By such compensating adjustment increased wear on the brake liner also results, decreasing the useful life of the brake liner.

Another problem with such electromagnetic brake assemblies is lack of cooling of the brake liner during operation of the brake. Wear of the brake is hastened because of lack of dissipation of the heat from the brake liner during operation. In fact, the electromagnetic brake assembly usually has no cooling means to dissipate the heat generated during operation of the brake.

The present invention overcomes these difficulties and disadvantages of prior electromagnetic brake assemblies. It provides means for adjusting the distance between the brake wheel and pressure plate assembly without increasing the force exerted on the pressure plate or varying the force exerted by the electromagnet. Further, it provides a means for cooling the brake liner during operation of the brake assembly, preferably by the power of the drive shaft to be braked by the assembly.

SUMMARY OF THE INVENTION

An electromagnetic brake assembly is comprised of a rotatable brake wheel fixed to a shaft which has the rotation thereof selectively braked by the brake assembly. A pressure plate assembly is non-rotatably mounted axially a given distance from the brake wheel during operational or running rotation of the shaft, and is adapted to axially move toward and away from the brake wheel. At least one, and generally two, brake liners preferably of unitary annular shape are adapted to frictionally engage between the brake wheel and pressure plate assembly when the pressure plate assembly is moved axially toward the brake wheel.

The brake assembly also includes an electromagnetic means mounted axially from the pressure plate assembly for moving the pressure plate assembly away from the brake wheel. Biasing means preferably of a mechanical nature are provided for urging the pressure plate assembly toward the brake wheel to engage the brake liner between the brake wheel and pressure plate assembly and brake the rotation of the brake wheel. The electromagnetic means thus preferably urges the pressure plate assembly away from the brake wheel against the force of the biasing means.

The electromagnetic brake assembly also has a gap control means for adjusting the given distance between the brake wheel and the pressure plate assembly during operational or running rotation of the shaft. Preferably, the pressure plate assembly is comprised of a pressure ring for engaging the brake liner on movement of the pressure plate assembly toward the brake wheel, and a brake armature for engaging the electromagnetic means on movement of the pressure plate assembly away from the brake wheel. The gap control means is in turn provided by means for selectively moving the pressure ring relative to the brake armature, most desirably by rotating the pressure ring and brake armature relative to each other. In the latter embodiment, a retainer means is provided for preventing relative rotation of the brake ring and brake armature during operation of the brake assembly.

It is also preferred that the brake assembly be provided with an indicator means for monitoring said given distance between the brake wheel and pressure plate assembly to determine when readjustment by the gap control means is needed.

The brake assembly also preferably includes cooling means for channelling air through passageways adjacent the brake liner to cool the brake assembly and add to the useful life of the brake liner. Preferably, the cooling means utilizes the rotational power of the shaft to be braked by the brake assembly. Mose desirably, the cooling means is comprised of stator means adjacent the periphery of the brake wheel for forcing the air through said passageway adjacent the brake liner.

Other details, objects and advantages of the invention will become apparent as the following description of the presently preferred embodiments thereof and presently preferred methods of practicing the same proceeds.

BRIEF DESCRIPTION OF THE DRAWINGS

In accompanying drawings, the presently preferred embodiments of the invention and presently preferred methods of practicing the invention are illustrated, in which.

DESCRIPTION OF THE PREFERRED EMBODIMENTS

Figure 1:
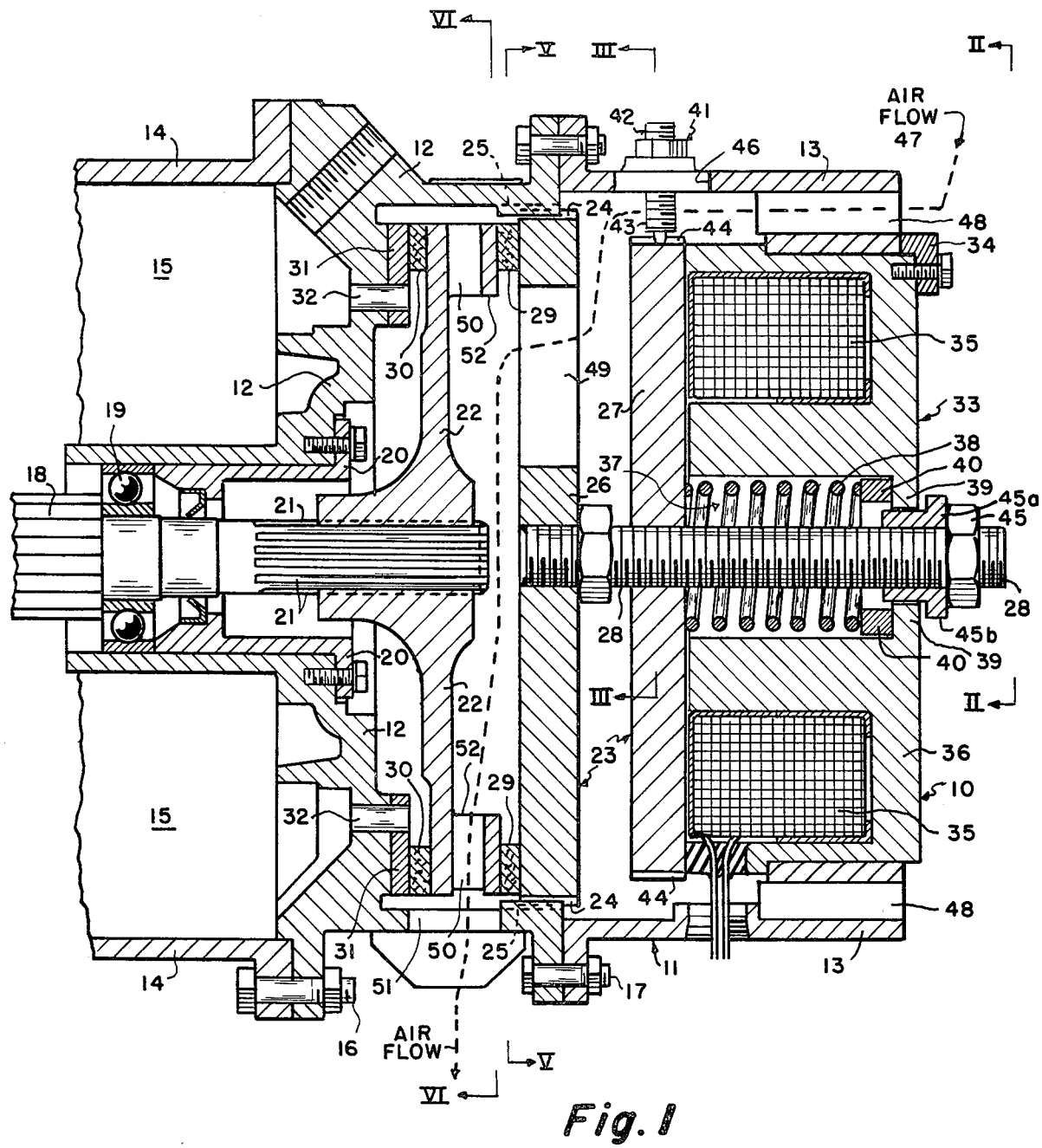
FIG. 1 is a cross-sectional view in elevation of a brake assembly of the present invention.
Figures 2, 3:
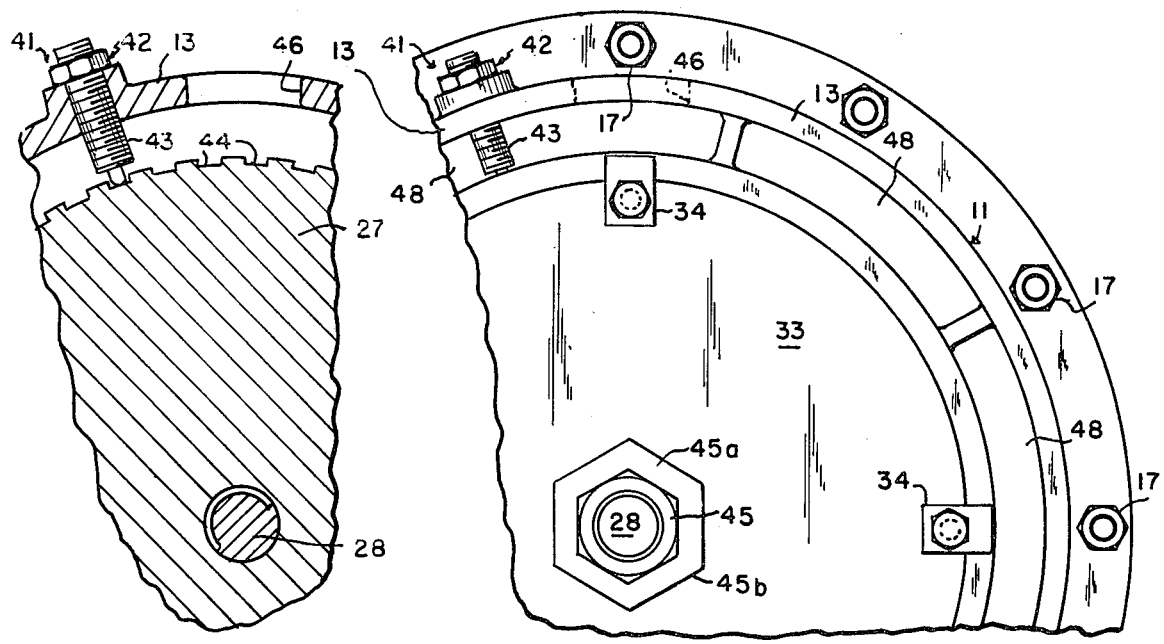
FIG. 2 is an end view in elevation taken from line II—II of FIG. 1.
FIG. 3 is a fragmentary cross-sectional view in elevation taken along line III—III of FIG. 1.
Figure 4:
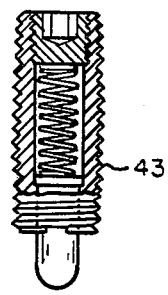
FIG. 4 is an elevational view with portions broken away of the spring loaded pin shown in assembly in FIG. 3.
Figure 5:
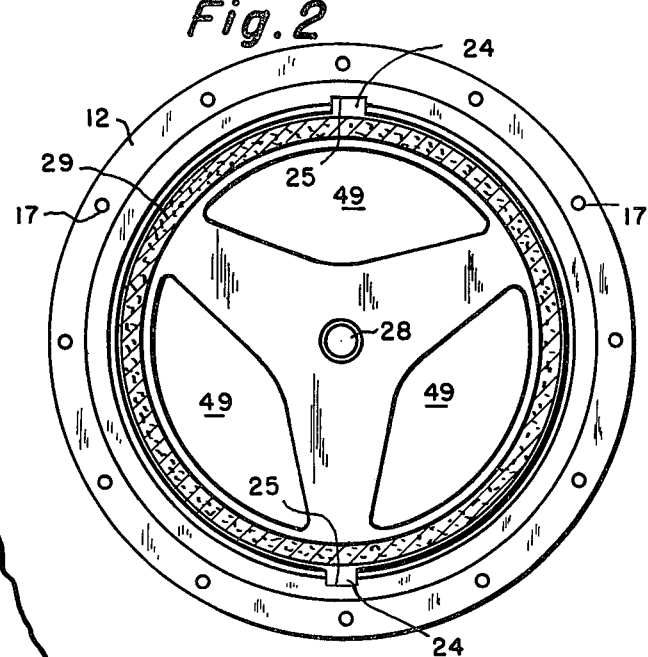
FIG. 5 is a cross-sectional view in elevation taken along line V—V of FIG. 1.
Figure 6:
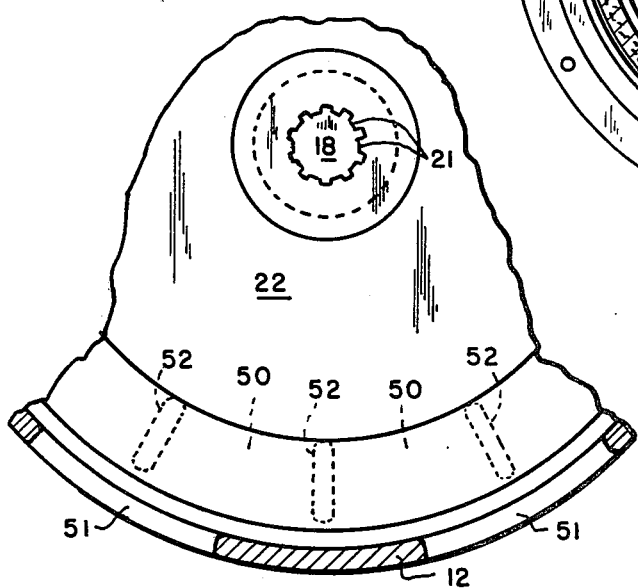
FIG. 6 is a fragmentary cross-sectional view taken along line VI—VI of FIG. 1.

Referring to FIGS. 1-5, electromagnetic brake assembly 10 is shown contained in housing 11 comprised of gear end head 12 and pot housing 13. Housing 11 is fastened to end portions 14 of gear box or electric motor 15 by nut and bolt assemblies at 16. Gear end head 12 and pot housing 13 are fastened together by nut and bolt assemblies at 17.

Gear box or electric motor 15 has drive shaft 18 to be selectively braked by brake assembly 10 supported by bearings 19 mounted in gear end head 12 with bearing seals 20. Drive shaft 18 has spline end portions 21, on which brake wheel 22 of the brake assembly is fixed to rotate with shaft 18.

Brake assembly 10 also comprises pressure plate assembly 23 mounted axially from brake wheel 22. Pressure brake assembly 23 is non-rotatably mounted in gear end head 12 by lugs 24 which engage slots 25 of gear end head 12. Pressure plate assembly 23 is hence adapted to move axially toward and away from brake wheel 22 a given distance, described in more detail hereinafter, during normal or operational rotation of drive shaft 18. Preferably, pressure plate assembly 23 is comprised of pressure ring 26 and brake armature 27 positioned axially relative to each other preferably threaded on center bolt assembly 28. Pressure ring 26 is provided for engaging brake liner 29 on movement of pressure plate assembly 23 toward brake wheel 22, and brake armature 27 is provided for engaging electromagnetic means 33 on movement of pressure plate assembly 23 away from brake wheel 22.

Positioned between brake wheel 22 and pressure plate assembly 23, typically adhesively fastened on pressure ring 26, is brake liner 29 preferably of a unitary annular shape. On movement of pressure plate assembly 23 toward brake wheel 22, brake liner 29 is thus adapted to frictionally engage between brake wheel 22 and pressure plate assembly 23. Additionally, brake liner 30, also typically of a unitary annular shape, is preferably positioned between brake wheel 22 and shoulder portions of gear end head 12 preferably by fastening it adhesively to brake ring 31, which is in turn fastened by dowles 32 to gear end head 12. Brake liner 30, thus assembled, increases the frictional engagement with brake wheel 22 and adds to the braking by brake assembly 10 on actuation thereof, while providing clearance for free rotation of brake wheel 22 during normal or operational rotation of drive shaft 18.

Brake assembly 10 is also provided with electromagnetic means 33 mounted axially from pressure plate assembly 23 in pot housing 13 by clamp assembly 34. Electromagnetic means 33 is comprised of coil winding 35 contained in coil pot 36, which is made of ferromagnetic material. By actuation of electromagnetic means 33, pressure plate assembly 23 can be moved away from brake wheel 22, typically against the force of bias means 37 as hereinafter described.

Biasing means 37 is comprised of compression spring 38 nested centrally in coil pot 36 between shoulder portions 39 of coil pot 36 and pressure plate assembly 23. Biasing means 37 hence is arranged and assembled to mechanically urge pressure plate assembly 23 toward brake wheel 22 to engage brake liners 29 and 30 with brake wheel 22 and brake the rotation of brake wheel 22. The force exerted by biasing means 37 against brake wheel 22 is controlled by the thickness of annular spacing ring 40. Alternatively, the biasing means may be provided by a bistable electromagnetic means such as described in U.S. Pat. No. 3,741,353.

Brake assembly 10 also includes gap control means 41 for adjusting the given distance between brake wheel 22 and pressure plate assembly 23 during normal rotation of shaft 18. Preferably, gap control means 41 is comprised of means for selectively moving pressure ring 26 relative to brake armature 27 most desirably by rotating pressure ring 26 relative to armature ring 27 on bolt assembly 28, which extends through electromagnetic means 33 as shown. Gap control means 41 preferably also includes retainer means 42 for preventing relative rotation of pressure ring 27 and brake armature 28 during operation of the brake assembly. Most desirably, retainer means 42 is comprised of spring loaded pin 43, shown in detail in FIG. 4, which engages one of a plurality of grooves 44 preferably equally spaced around the periphery of brake armature 27.

To adjust the distance between brake wheel 22 and pressure plate assembly 23, the brake assembly is deenergized with biasing means 37 urging pressure plate assembly 23 to engage brake liners 29 and 30 with brake wheel 22. Check nut 45 of bolt assembly 28 is loosened and spring bushing 45A of bolt assembly 28 is loosened to obtain suitable check clearance (e.g. 1/16 inch) between flange portions 45B of bushing 45A and coil pot 36. Through opening 46 in pot housing 13, grooves 44 in brake armature 27 are thereafter engaged with a screwdriver or like instrument ot turn brake armature 27 on bolt 28 relative to pressure ring 26, allowing spring loaded pin 43 to click through grooves 44, until brake armature 27 contacts coil pot 36 and brake liner 29 and 30 are compressed against brake wheel 22. Brake armature 27 is then turned the opposite direction 6 to 8 grooves 44 to provide for the given distance for rotational operation between brake wheel 22 and pressure plate assembly 23.

Indicator means for monitoring said given set distance are provided by spring bushing 45A. The check clearance between shoulder portions 45B of spring bushing 45A and coil pot 36, which was set at, for example, 1/16 inch is observed for change during operation of the brake assembly. When the clearance is reduced a given amount (e.g. 3/64 inch), the gap control means 41 can be reactivated, as above described in setting the original given distance, to reset the given operating or running distance.

Spring bushing 45A can also be used to manually release brake assembly 10 from brake wheel 22. Spring bushing 45A is turned to engage shoulder portions 45B against shoulder portions 39 of coil pot 36. Threading of spring bushing 45A onto bolt assembly 28 is thereafter continued to compress biasing means 37 until pressure plate assembly 23 contacts coil pot 36, thereby releasing the brake.

Alternatively, gap control means 41 may be embodied by rotating pressure ring 26 to provide the relative rotation between pressure ring 26 and brake armature 27. Or, gap control means 41 may be provided by axial movement of brake wheel 22 or electromagnetic means 33 relative to pressure plate assembly 23.

Brake assembly 10 also preferably has cooling means 47 for channelling air through passageways adjacent brake liners 29 and 30 to cool the brake liners and brake wheel during operation of the brake assembly, adding to the useful life of the brake liners. Preferably, the cooling means are provided by the power of normal operation of the rotation of shaft 18 which is to be braked by the brake assembly. The passageway for channelling the air past the brake liners is provided by annular openings 48 in pot housing 13, radial openings 49 in brake armature 26, openings 50 through brake wheel 22 between brake liners 29 and 30, and openings 51 in gear end head 12 adjacent brake wheel 22. Preferably, the air is forced through the passageway to cool the brake liners by stator means 52 provided along the periphery of brake wheel 22 between openings 50. Alternatively, cooling means can be embodied by providing another passageway for the air past brake liners 29 and 30, or by other pumping action than stator means 52. The essential fact is that cooling means force air past brake liners 29 and 30 to cool the brake liners and brake wheel during normal operation of the drive shaft, preferably without additional power means.

While the invention has been described and shown with particularity in the foregoing description, it should be distinctly understood that the invention may be otherwise variously embodied and used particularly within the scope of the following claims.

What is claimed is:

1. An electromagnetic brake assembly comprising:
   A. A rotatable brake wheel fixed to a shaft which has the rotation thereof selectively braked by the brake assembly;
   B. a pressure ring nonrotatably mounted axially a given distance from said brake wheel during operational rotation of said shaft and adapted to axially move toward and away from the brake wheel;
   C. a brake armature mounted axially from said pressure ring and adapted to axially move in fixed relation with respect to said pressure ring during operational rotation of said shaft;
   D. at least one brake liner adapted to fricationally engage between the brake wheel and pressure ring when the pressure ring is moved axially toward the brake wheel;
   E. an electromagnetic means mounted axially from the brake armature for engaging the brake armature to move the pressure ring away from the brake wheel;
   F. biasing means for urging the brake armature and pressure ring toward the brake wheel to engage the brake liner between the brake wheel and pressure ring and brake the rotation of the brake wheel; and
   G. gap control means for adjusting the axial distance between the brake wheel and the pressure ring.

2. An electromagnetic brake assembly as set forth in claim 1 wherein:
   said gap control means comprises means for selectively moving the pressure ring relative to the brake armature.

3. An electromagnetic brake assembly as set forth in claim 2 wherein:
   said gap control means comprises means for rotating the pressure ring and the brake armature relative to each other, and retainer means for preventing relative rotation of the pressure ring and brake armature during operation of the brake assembly.

4. An electromagnetic brake assembly as set forth in claim 1 comprising in addition:
   an indicator means for monitoring said given distance between the brake wheel and pressure ring during operational rotation of the shaft to determine need for readjustment by the gap control means.

5. G. cooling means for channelling air through passageways that include openings through the brake wheel, said openings being adjacent to the brake liner.

6. An electromagnetic brake assembly as set forth in claim 5 wherein:
   said cooling means is provided by rotation of the shaft during operation.

7. An electromagnetic brake assembly as set forth in claim 6 wherein:
   said cooling means comprises stator means adjacent the periphery of the brake wheel for forcing said air through said passageway adjacent the brake liner.

8. An electromagnetic brake assembly comprising:
   A. a rotatable brake wheel fixed to a shaft which has the rotation thereof selectively braked by the brake assembly;
   B. a pressure ring nonrotatably mounted, axially a given distance from said brake wheel during operational rotation of said shaft and adapted to axially move toward and away from the brake wheel;
   C. a brake armature mounted axially from said pressure ring and adapted to axially move in fixed relation with respect to said pressure ring during operational rotations of said shaft;
   D. at least one brake liner adapted to frictionally engage between said brake wheel and pressure ring when the pressure ring is moved axially toward the brake wheel;
   E. a mechanical bias means for urging the brake armature and pressure ring toward the brake wheel to engage the brake liner between the brake wheel and pressure ring and brake the rotation of the brake wheel;
   F. an electromagnetic means mounted axially from the brake armature for selectively engaging the brake armature to urge the pressure ring away from the brake wheel against the bias means; and
   G. a means for adjusting the axial distance between the brake wheel and the pressure ring.

9. An electromagnetic brake assembly as set forth in claim 8 wherein:
   said gap control means comprises means for selectively moving the pressure ring relative to the brake armature.

10. An electromagnetic brake assembly as set forth in claim 9 wherein:
    said gap control means comprises means for rotating the pressure ring and the brake armature relative to each other, and retainer means for preventing relative rotation of the pressure ring and brake armature during operation of the brake assembly.

11. An electromagnetic brake assembly as set forth in claim 8 comprising in addition:
an indicator means for monitoring said given distance between the brake wheel and pressure plate assembly during operational rotation of the shaft to determine need for readjustment by the gap control means.

12. An electromagnetic brake assembly as set forth in claim 8 comprising in addition:
G. cooling means for channelling air through passageways that include openings through the brake wheel, said openings being adjacent to the brake liner.

13. An electromagnetic brake assembly as set forth in claim 12 wherein:
said cooling means is provided by rotation of the shaft during operation.

14. An electromagnetic brake assembly as set forth in claim 13 wherein:
said cooling means comprises stator means adjacent the periphery of the brake wheel for forcing said air through said passageway adjacent the brake liner.

15. An electromagnetic brake assembly comprising:
A. a rotatable brake wheel fixed to a shaft which has the rotation thereof selectively braked by the brake assembly;
B. a pressure ring nonrotatably mounted axially a given distance from said brake wheel during operational rotation of said shaft and adated to axially move toward and away from the brake wheel;
C. a brake armature mounted axially from said pressure ring and adapted to axially move in fixed relation with respect to said pressure ring during operational rotation of said shaft;
D. at least one brake liner adapted to frictionally engage between the brake wheel and pressure ring when the pressure ring is moved axially toward the brake wheel;
E. an electromagnetic means mounted axially from the brake armature for engaging the brake armature to move the pressure ring away from the brake wheel;
F. biasing means for urging the brake armature and pressure ring toward the brake wheel to engage the brake liner between the brake wheel and pressure ring and brake the rotation of the brake wheel; and
G. cooling means for channelling air through passageways that include openings through the brake wheel, said openings being adjacent to the brake liner.

16. An electromagnetic brake assembly as set forth in claim 15 wherein:
said cooling means is provided by rotation of the shaft during operation.

17. An electromagnetic brake assembly as set forth in claim 16 wherein:
said cooling means comprises stator means adjacent the periphery of the brake wheel for forcing said air through said passageway adjacent the brake liner.

* * * * *